United States Patent Office 2,911,408
Patented Nov. 3, 1959

2,911,408

HYDROXYPIPERIDINO-N-ALKYLENE ALDEHYDES

John H. Biel, Milwaukee, Wis., assignor to Lakeside Laboratories, Inc., a corporation of Wisconsin No Drawing. Application January 28, 1957
Serial No. 636,492

6 Claims. (Cl. 260—294.7)

This invention relates to novel chemical compounds and processes for preparing the same. More particularly, this invention is concerned with novel N-alkylene aldehyde derivatives of hydroxypiperidines.

According to the present invention there are provided hydroxypiperidinoalkylene aldehydes and esters and ethers thereof, of the formula

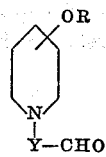

wherein R is hydrogen, a lower alkyl group, a monocyclic aryl group such as phenyl, a monocyclic aryl-lower alkyl group such as phenylmethyl and phenylethyl, a nuclear substituted monocyclic aryl-lower alkyl group such as p-hydroxyphenylmethyl, an amino-lower alkyl group such as 2-dialkylaminoethyl, an N-lower alkyl piperidyl group such as N-ethyl piperidyl, a heterocyclic alkyl group such as furfuryl or thienyl, an ester radical such as a lower alkyl acyl group such as acetyl and propionyl, a monocyclic aryl-lower alkyl acyl group such as phenylacetyl, benzoyl, 7-theophyllineacetyl, nicotinyl and picolinyl, the OR group being located in the 3 or 4 position of the piperidino nucleus, and Y is an alkene group of 1 through 7 carbons and is a straight or branch chain.

Production of such compounds may be achieved by reacting a 3 or 4-hydroxypiperidine, or an ester or ether derivative thereof, with a haloalkylene acetal to form the corresponding hydroxypiperidinoalkylene acetal and hydrolyzing the said acetal to the corresponding hydroxypiperidinoalkylene aldehydes. This process may be represented as follows:

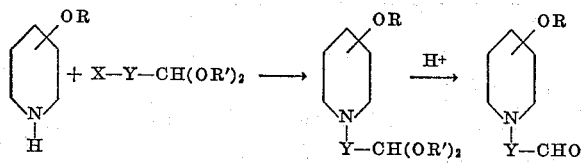

wherein X is bromine or chlorine, R' is a lower alkyl group and Y and R have the significance previously assigned.

In the first step of this process there may be used as starting materials 3-hydroxypiperidine and 4-hydroxypiperidine or ethers or esters thereof such as 3-methoxypiperidine, 4-acetoxypiperidine, 4-phenethoxypiperidine, 3 - benzoyloxypiperidine, 4 - (β - aminoethoxy)piperidine and so forth.

Representative haloalkylene acetals which may be used are bromoacetal, 1 - chloro - 3,3 - dipropoxy propane, 1-bromo-6,6-diethoxy hexane and 1-chloro-4,4-dipropoxy butane.

The 3 or 4-hydroxypiperidine and the acetal are conveniently reacted in the presence of a suitable inert liquid reaction medium. Solvents such as toluene, benzene, xylene, hexane and lower alcohols may be used. A tertiary amine such as triethylamine is generally included in the reaction mixture to combine with the hydrohalide formed in the reaction. Elevated temperatures such as the reflux temperature are preferred to effect reaction in a matter of hours. After the reaction is terminated the reaction mixture may be filtered and the filtrate evaporated under reduced pressure to first distill off the solvent and then the product.

Typical hydroxypiperidino alkylene acetals which are so produced are 3-hydroxypiperidino acetal, 3-(3-hydroxypiperidino)-1-diethoxy propane, 6-(3-hydroxypiperidino)-1-dipropoxy hexane, the related compounds having the hydroxy group in the 4 position of the piperidino group and compounds in which the nuclear hydroxy is replaced by derivatives thereof, such as esters and ethers as previously described.

The acetals are readily hydrolyzed by aqueous mineral acids to the corresponding aldehydes. For this purpose concentrated hydrochloric acid is generally used since it is readily evaporated from the reaction mixture. The product need not be recovered but may be used in aqueous solution for the next reaction, the mixture first having been neutralized with sodium hydroxide.

Some of the novel aldehydes so produced are 3-hydroxypiperidino acetaldehyde, 4-hydroxypiperidino acetaldehyde, 3-hydroxypiperidino propionaldehyde, 3-hydroxypiperidino valeraldehyde, 4-hydroxypiperidino butyraldehyde, 3-hydroxypiperidino caprylaldehyde and related derivatives in which the 3 or 4 hydroxyl group has been converted to an ester or an ether group such as previously specified.

The novel aldehydes provided by this invention are useful in producing hydrazine derivatives having diuretic properties as disclosed in my copending application, Serial No. 636,491, filed January 28, 1957.

The following examples are presented to show methods of producing certain of the novel compounds included within this invention. It is to be understood, however, that these examples are included only for purposes of illustration, and that the invention is not to be restricted to the embodiments specifically disclosed therein.

EXAMPLE 1

*3-hydroxypiperidino acetal*

A mixture of 68 g. (0.67 mole) of 3-hydroxypiperidine, 67 g. (0.67 mole) triethylamine, 132 g. (0.67 mole) bromoacetal and 400 cc. dry toluene was refluxed for four hours. The triethylamine hydrobromide was filtered off, washed with toluene, dried, and weighed 33.1 g. (theory 122 g.). The filtrate was washed several times with saturated potassium carbonate solution and dried briefly over anhydrous potassium carbonate. The toluene was distilled off under vacuum with a water bath, and the product distilled at 98–100° C. at 0.6 mm.

Yield 90.95 g. or 62.5% $N_D^{25}$ 1.4632.

*Analysis.*—Calcd. for $C_{11}H_{23}NO_3$: N, 6.44. Found: N, 6.65.

EXAMPLE 2

32.6 grams (0.15 mole) of 3-hydroxypiperidino acetal was added in fifteen minutes to 150 cc. of concentrated hydrochloric acid at 5–10° C. After standing overnight at room temperature, the excess hydrochloric acid and water was distilled off under vacuum with a 50° C. water bath. The residue was diluted to 150 cc. volume with distilled water and neutralized to pH 7 with 14 g. of 20% sodium hydroxide solution to form 3-hydroxypiperidino acetaldehyde.

EXAMPLE 3

4-hydroxypiperidino acetal

To 30.30 g. (0.3 mole) of 4-hydroxypiperidine and 30.3 g. (0.3 mole) of triethylamine in 200 cc. dry toluene at reflux was added 59.1 g. (0.3 mole) of bromoacetal in thirty minutes. After refluxing the mixture for six hours the salt was filtered off and washed with toluene. The filtrate was washed twice with 100 cc. portions of saturated potassium carbonate. Organic material was dried briefly over $K_2CO_3$. The solvent was distilled off through a 10″ Vigreux column on a steam bath under vacuum; and the residue was vacuum distilled at 112–118° C. at 0.6–0.7 mm.

Yield 30.1 g. or 46.2% $N_D^{25}$ 1.4672.

Analysis.—Calcd. for $C_{11}H_{25}NO_3$: 6.44. Found: 7.0.

EXAMPLE 4

4-hydroxypiperidino acetaldehyde

To 140 cc. of concentrated hydrochloric acid at 5° C. was added 29.8 g. (0.137 mole) of 4-hydroxypiperidino acetal. The solution was left standing overnight at 25° C. The excess hydrochloric acid and water were distilled off under vacuum with a 50° C. water bath. The residue was diluted to 140 cc. volume with water and neutralized with 21 cc. of 10% sodium hydroxide solution to pH 7 to form 4-hydroxypiperidino acetaldehyde.

Various changes and modifications of the invention can be made and, to the extent that such variations incorporate the spirit of this invention, they are intended to be included within the scope of the appended claims.

What is claimed is:

1. A member of the group consisting of compounds of the formulae:

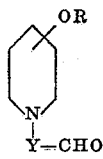

and

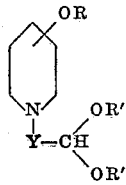

wherein Y represents alkylene groups having from 1 through 7 carbons, OR is a group located at a member of the group consisting of the 3 and 4 positions of the piperidino nucleus, R is a member of the group consisting of hydrogen, lower alkyl, monocyclic aryl, monocyclic aryl-lower alkyl, amino-lower alkyl, N-lower alkyl piperidyl, furfuryl, thienyl, acyl group derived from a lower carboxylic acid, and monocyclic aryl-acyl groups in which the acyl group is derived from a lower carboxylic acid, and R′ is lower alkyl.

2. 3-hydroxypiperidino acetal.
3. 4-hydroxypiperidino acetal.
4. 3-hydroxypiperidino lower alkylene aldehydes.
5. 4-hydroxypiperidino lower alkylene aldehydes.
6. The process which comprises reacting a compound of the formula

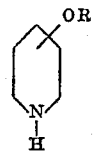

with a compound of the formula $$X-Y-CH(OR')_2$$

to produce a compound of the formula

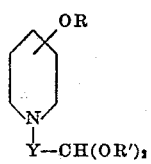

and hydrolyzing said acetal to the corresponding aldehyde of the formula

wherein Y represents alkylene groups having from 1 through 7 carbons, OR is a group located at a member of the group consisting of the 3 and 4 positions of the piperidino nucleus, R is a member of the group consisting of hydrogen, lower alkyl, monocyclic aryl, monocyclic aryl-lower alkyl, amino-lower alkyl, N-lower alkyl piperidyl, furfuryl, thienyl, acyl group derived from a lower carboxylic acid, and monocyclic aryl-acyl groups in which the acyl group is derived from a lower carboxylic acid, X is a reactive halogen and R′ represents lower alkyl groups.

References Cited in the file of this patent

UNITED STATES PATENTS 2,247,569    Brunkew et al. _____ July 1, 1941

OTHER REFERENCES

Beech: J. Chem. Soc., 1951, pp. 2483–7, Abstracted from Chem. Abst., vol. 46, pp. 8003F (1952).

Galinousky: Chem. Abst., 45:29416 (1951).

UNITED STATES PATENT OFFICE
CERTIFICATE OF CORRECTION

Patent No. 2,911,408              November 3, 1959

John H. Biel

It is hereby certified that error appears in the printed specification of the above numbered patent requiring correction and that the said Letters Patent should read as corrected below.

Column 1, line 42, for "alkene" read -- alkylene --.

Signed and sealed this 21st day of June 1960.

(SEAL)
Attest:

KARL H. AXLINE
Attesting Officer

ROBERT C. WATSON
Commissioner of Patents